Patented Sept. 8, 1942

2,295,274

UNITED STATES PATENT OFFICE 2,295,274

METHOD OF PREPARING HOMOGENEOUS HONEY PECTIN COMPOSITION

Joseph E. Walker, Saginaw, Mich.

No Drawing. Application August 14, 1939, Serial No. 290,130

2 Claims. (Cl. 99—132)

The present invention relates to the production of a composition consisting predominately of honey together with pectin, the honey and pectin being combined in such a form as to form a solid jelly or gel, characterized by the property of being self-supporting or self-sustaining.

In carrying out the present invention honey is heated until it boils, the boiling point depending upon the amount of water carried by or mixed with the honey. Preferably, the honey is dissolved in or is dispersed in a considerable quantity of water, as this appears to assist in producing the most satisfactory product. The mixture of honey and water, or other aqueous medium, upon boiling assumes a very thin consistency, approaching that assumed by thin syrup in the summer time. It is of course obvious that the aqueous medium referred to is one favorable for gel formation, and further will allow the mixture to become thin upon boiling. Preferably, while the mixture of honey and water is boiling a pectin is added thereto. The addition of the pectin tends to cool the mixture of the honey and water below its boiling point and, therefore, it is desirable that after the addition of the pectin the mixture be heated, to maintain the honey-pectin mixture at or adjacent the boiling point of the mixture. Instead of adding all of the pectin at one time, it may be added in increments, while the aqueous solution of honey is maintained at the boiling point. This will prevent any substantial cooling of the aqueous solution of the honey, or that carrying pectin below the boiling point of the mixture.

It may be stated that for the production of the most satisfactory product the honey-pectin mixture is heat-treated for a period varying between one to thirty minutes, the temperature being maintained from 212° F. to 225° F., the higher temperature facilitating the production of a better product. The criterion is that the boiling should be continued for a sufficient length of time to insure the substantially complete gelation of the product, while inhibiting any rubberiness characteristic in the finished jelly.

A specific example illustrating the present invention is as follows:

To about nine gallons of honey there is preferably, although not necessarily, added three and one-half gallons of water and the mixture is brought to a hard boil, that is, to a temperature at which the mixture of honey and water begins to bubble and indicate the boiling temperature has been reached. Obviously, this temperature will vary with various kinds of honey and with the amount of water that is added to the honey. However, usually the boiling temperature is between 212° F. and 225° F., but preferably about 218° F. The time which is necessary for the bringing of honey and water to a boiling temperature will depend upon the rate at which the mixture is being heated. The faster the rate of heating the less the time necessary for the mixture to obtain the boiling temperature. Upon being heated to the boiling temperature the mixture or solution of honey and water assumes a rather thin consistency. Thereafter about two gallons of pectin are added.

The honey-pectin solution is then heat-treated at a temperature varying between 212° F. and 225° F. for a period varying between approximately one to thirty minutes. If the honey-pectin mixture is heat-treated for twenty minutes, at a temperature between 218° F. to 225° F., the product is somewhat better gelled, more homogeneous and has a firmer consistency, that is, the self-supporting or self-sustaining characteristics of the composition are very much better. Obviously, the temperature of boiling will depend to some extent upon the percentage of water that has been added to the honey mixture.

It is to be understood that the preferred manner of carrying out the present invention is to mix the honey with a substantial amount of water and then boil the mixture, prior to the addition of the pectin, and then preferably to again heat-treat the mixture upon the addition of the pectin, as has been previously pointed out.

Another example illustrative of the present invention is to mix fifteen gallons of water and add three gallons of a pectin adapted to gel 210 pounds of sugar. The method of preparation is similar to that previously set forth.

The above example indicates that the amount of water and the amount of pectin may be varied, provided the procedure herein set forth is followed.

Instead of adding liquid pectin, there may be added to nine gallons of honey, one pound of dry pectin. Nine gallons of liquid honey weighs approximately 108 pounds. Therefore, the amount of pectin which is preferably used should be around 1%, based on the weight of the honey.

The liquid pectin which is added may be any standard liquid pectin, but preferably that which is used is produced by John C. Morgan Company, Treverse City, Michigan. It may be stated that pectin is on the market as a dry pectin or as a liquid pectin. The dry pectin is designated by the capacity thereof to gel sugar, for example, a one hundred grade pectin will gel one hundred times its own weight of sugar and the fifty grade dry pectin will gel fifty times its weight of sugar. The liquid pectin, which is on the market, is also designated by its capacity to gel sugar, for example, one gallon of sixty grade solution of pectin will contain sufficient pectin to gel sixty pounds of sugar, and is, therefore, termed a sixty grade pectin solution. If one gallon of the liquid pectin contains enough pectin to gel thirty pounds of sugar, the pectin is termed a thirty grade pectin.

In carrying out the present invention the pectin which is added is preferably that solution, a gallon of which will function to gel 40 pounds of honey. Obviously, the grade of liquid pectin used may vary considerably and still be within the spirit of the present invention. The point is, that enough pectin must be added to the boiling honey or solution of honey in water to confer upon the honey self-supporting characteristics without the aid of any extraneous medium which would likewise function to make the honey self-supporting.

At this point it may be stated that it is known to produce an aerated honey product comprising crystallized honey, together with small amounts of albumen and pectin. However, this product is prepared by liquefying, at a temperature not to exceed 130° F. to 140° F.

The present product is prepared by heating an aqueous solution to 212° F. Further, the product of the prior art was aerated and the function of the pectin was to surround air bubbles with relatively firm and tough cell walls of gelled syrup. The present product is non-aerated and does not contain any individual cells. The pectin functions to produce a honey-pectin mixture, which is substantially solid throughout, that is, the composition is substantially homogeneous. It is not necessary that the present product crystallize. On the contrary, in the best form of the invention the honey is of non-crystalline character.

The liquid pectin may have in admixture therewith a small quantity of sugar.

This pectin or the powdered pectin is preferably a fruit pectin made from apples, so that the original flavor of the honey is retained. Citrous liquid pectin or powdered pectin may be used, but functions to change or mask the original flavor of the honey and thereby imparts a taste to the honey which makes the latter not so palatable as when a fruit pectin is used. The pectin which is herein used preferably has in admixture therewith a small proportion of an organic acid, as, for example, citric acid or tartaric acid. Such acids do not materially affect the flavor or palatability of the honey. Any of the prior art weak organic acids may be used with the pectin. The pectin may have in admixture therewith phosphoric acid. However, a pectin of this character is not quite so satisfactory for use as those containing tartaric or citric acids, as the phosphoric acid tends to mask the flavor and change the palatability of the honey.

What is claimed is:

1. The method of preparing a substantially homogeneous self-supporting honey jelly comprising heating an aqeuous solution of honey to its boiling point, adding to said solution while it is kept adjacent its boiling point only a sufficient amount of a standard pectin of commerce to jell the so-treated honey and confer self-supporting characteristics on the honey jelly, and a small quantity of edible acid, said reaction mixture consisting predominantly of honey; and further boiling the mixture to a state where it is jelled and is free of any rubbery characteristic.

2. The method of preparing a substantially homogeneous self-supporting honey jelly comprising heating an aqueous mixture of honey between 218° to 225°, adding to said honey solution while it is kept adjacent its boiling point only a sufficient amount of standard pectin of commerce to jell the so-treated honey and confer self-supporting characteristics on the honey jelly, said reaction mixture consisting predominantly of honey, and further boiling the reaction mixture at a temperature between about 218° to 225° to a state where it is jelled and free of rubberiness.

JOSEPH E. WALKER.